United States Patent
Rodriguez Erdmenger et al.

(10) Patent No.: US 10,794,266 B2
(45) Date of Patent: Oct. 6, 2020

(54) SYSTEM FOR COOLING ENGINE INTAKE FLOW

(71) Applicant: AI ALPINE US BIDCO INC, Wilmington, DE (US)

(72) Inventors: Rodrigo Rodriguez Erdmenger, Munich (DE); Jassin Marcel Fritz, Munich (DE)

(73) Assignee: AI ALPINE US BIDCO INC, Wilmington, DE (US)

( * ) Notice: Subject to any disclaimer, the term of this patent is extended or adjusted under 35 U.S.C. 154(b) by 32 days.

(21) Appl. No.: 16/081,467

(22) PCT Filed: Mar. 31, 2016

(86) PCT No.: PCT/US2016/025248
§ 371 (c)(1),
(2) Date: Aug. 31, 2018

(87) PCT Pub. No.: WO2017/171793
PCT Pub. Date: Oct. 5, 2017

(65) Prior Publication Data
US 2019/0072026 A1    Mar. 7, 2019

(51) Int. Cl.
*F02B 29/04* (2006.01)
*F02B 37/00* (2006.01)
(Continued)

(52) U.S. Cl.
CPC ........ *F02B 29/0481* (2013.01); *F02B 37/004* (2013.01); *F02B 37/013* (2013.01);
(Continued)

(58) Field of Classification Search
CPC .. F02B 29/0481; F02B 37/004; F02B 39/085; F02B 37/10; F02B 37/013; F01K 23/065
See application file for complete search history.

(56) References Cited

U.S. PATENT DOCUMENTS 5,269,143 A    12/1993    Cikanek et al.
5,669,363 A     9/1997    Francis
(Continued)

FOREIGN PATENT DOCUMENTS

DE    102009031845 A1    1/2011
EP          0655550 A1    11/1994
(Continued)

OTHER PUBLICATIONS

Ugur Kesgin, "Efficiency improvement and NOx emission reduction potentials of two-stage turbocharged Miller cycle for stationary natural gas engines", International Journal of Energy Research, vol. 29, Issue: 3, pp. 189-216, Mar. 10, 2005.
(Continued)

*Primary Examiner* — Shafiq Mian
(74) *Attorney, Agent, or Firm* — Fletcher Yoder, P.C.

(57) ABSTRACT

A system includes an air source, an internal combustion engine, a first turbocharger, a second turbocharger, and a third turbocharger. The first turbocharger includes a first turbine and a first compressor, the second turbocharger includes a second turbine and a second compressor, and the third turbocharger includes a third turbine and a third compressor. The third compressor is fluidly coupled to the air source and is fluidly coupled to one of the first compressor and the second compressor. The first compressor is fluidly coupled upstream of the second compressor, and the second compressor is fluidly coupled upstream of the third turbine. The third turbine is fluidly coupled upstream of the internal combustion engine.

21 Claims, 2 Drawing Sheets

Figure 1:
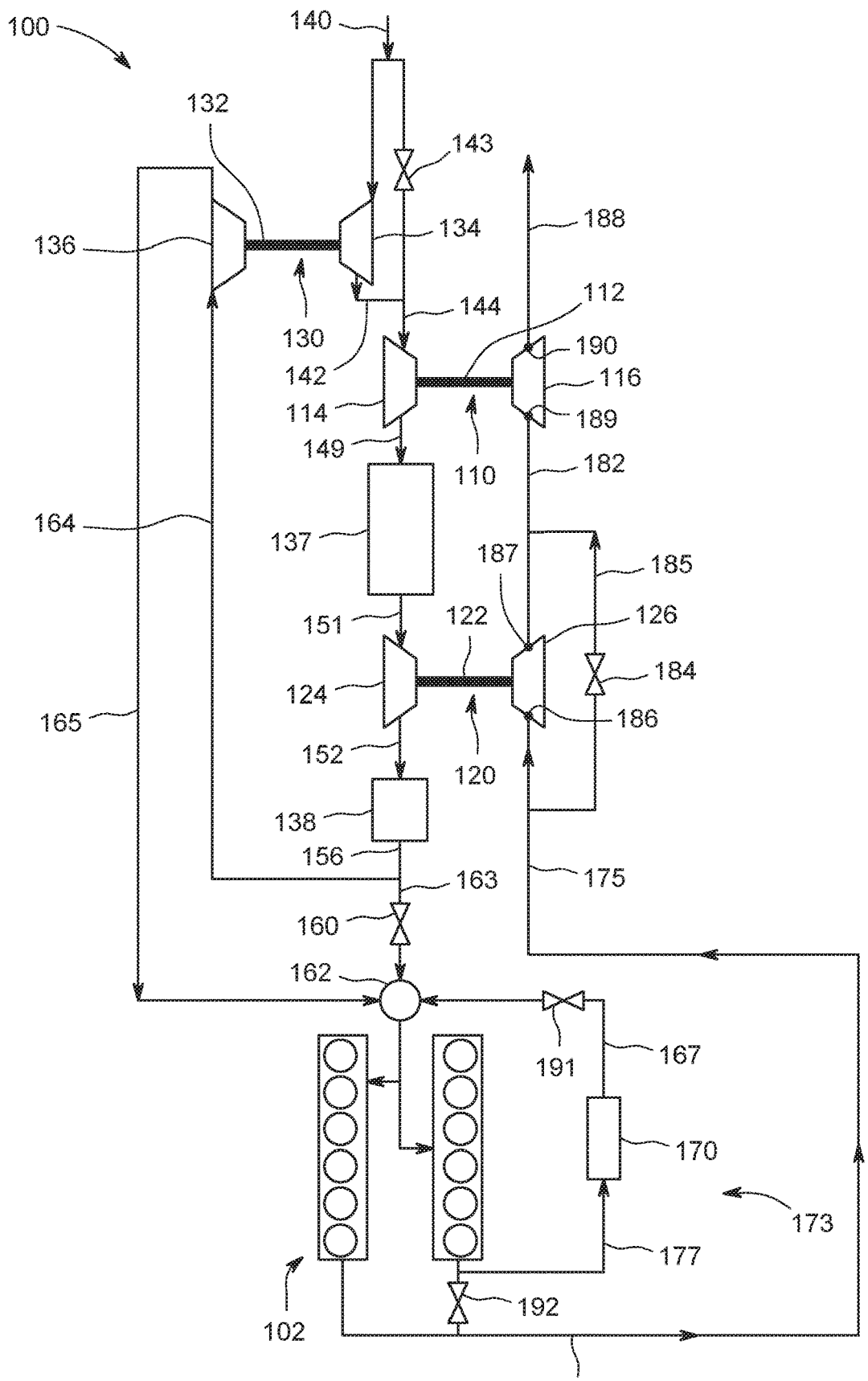

(51) Int. Cl.
*F02B 37/013* (2006.01)
*F02B 37/10* (2006.01)
*F02B 39/08* (2006.01)
*F02B 37/04* (2006.01)

(52) U.S. Cl.
CPC ............ *F02B 37/04* (2013.01); *F02B 37/10* (2013.01); *F02B 39/085* (2013.01); *Y02T 10/144* (2013.01); *Y02T 10/146* (2013.01)

(56) References Cited

U.S. PATENT DOCUMENTS

| | | | |
|---|---|---|---|
| 6,324,846 B1 * | 12/2001 | Clarke | F01N 3/306 60/605.2 |
| 6,883,315 B2 | 4/2005 | Shakenis et al. | |
| 7,426,830 B2 * | 9/2008 | Schorn | F02B 37/001 60/612 |
| 8,893,494 B2 | 11/2014 | Auffret et al. | |
| 8,925,317 B2 | 1/2015 | Rodriguez Erdmenger et al. | |
| 9,097,174 B2 | 8/2015 | Sellnau | |
| 2013/0031902 A1 * | 2/2013 | Erdmenger | F02M 23/00 60/605.1 |
| 2014/0150423 A1 * | 6/2014 | Heyes | F02B 37/18 60/599 |
| 2014/0358404 A1 * | 12/2014 | Lavertu | F02B 37/013 701/105 |
| 2017/0114734 A1 * | 4/2017 | Weiss | F02B 29/04 |

FOREIGN PATENT DOCUMENTS

| | | | | |
|---|---|---|---|---|
| EP | 0655550 A1 * | 5/1995 | | F02B 29/0412 |
| EP | 1233162 A1 | 8/2002 | | |
| GB | 2129055 A | 10/1983 | | |

OTHER PUBLICATIONS

International Search Report and Written Opinion dated Jul. 15, 2016 which was issued in connection with PCT application No. PCT/US2016/25248 which was filed on Mar. 31, 2016.

* cited by examiner

SYSTEM FOR COOLING ENGINE INTAKE FLOW

BACKGROUND

The field of the disclosure relates generally to internal combustion engines and, more particularly, to a system for cooling engine intake flow.

Many known internal combustion engines utilize the Miller cycle to meet emissions requirements, particularly with respect to nitrogen oxide and nitrogen dioxide emissions, and to avoid knocking at high engine loads and higher compression ratios. In the Miller cycle, an intake valve to a cylinder is either closed early before a piston reaches bottom dead center during the intake stroke (colloquially known as "early Miller"), or alternatively are left open during a portion of the compression stroke (colloquially known as "late Miller"). This leads to a reduction of temperature in the cylinder, and to a longer effective expansion stroke compared to an effective compression stroke. However, a disadvantage of the Miller cycle is the reduction in volumetric efficiency of the engine.

BRIEF DESCRIPTION

In one aspect, a system for conditioning intake air to an internal combustion engine is provided. The system includes an air source, an internal combustion engine, a first turbocharger, a second turbocharger, and a third turbocharger. The first turbocharger includes a first turbine and a first compressor, the second turbocharger includes a second turbine and a second compressor, and the third turbocharger includes a third turbine and a third compressor. The third compressor is fluidly coupled to the air source and is fluidly coupled to one of the first compressor and the second compressor. The first compressor is fluidly coupled upstream of the second compressor, and the second compressor is fluidly coupled upstream of the third turbine. The third turbine is fluidly coupled upstream of the internal combustion engine.

In another aspect, a system for conditioning intake air to an internal combustion engine is provided. The system includes an air source, an internal combustion engine, at least one exhaust turbocharger, and an intake turbocharger. The at least one exhaust turbocharger includes an exhaust turbine and an exhaust compressor. The intake turbocharger includes an intake turbine and an intake compressor. The intake compressor is fluidly coupled to the air source and is fluidly coupled to the exhaust compressor. The exhaust compressor is fluidly coupled upstream of the intake turbine, and the intake turbine is coupled upstream of the internal combustion engine.

In yet another aspect, a method of cooling intake air for an internal combustion engine using an intake delivery system is provided. The system includes an air source, an internal combustion engine, a first turbocharger including a first turbine and a first compressor, a second turbocharger including a second turbine and a second compressor, and a third turbocharger including a third turbine and a third compressor. The method includes compressing air from the air source with the third compressor, compressing air from the third compressor with the first compressor, and compressing air from the first compressor with the second compressor. The method further includes expanding an airflow discharged by the second compressor with the third turbine, and directing at least a portion of an airflow discharged by the third turbine to the internal combustion engine.

DRAWINGS

Figure 2:
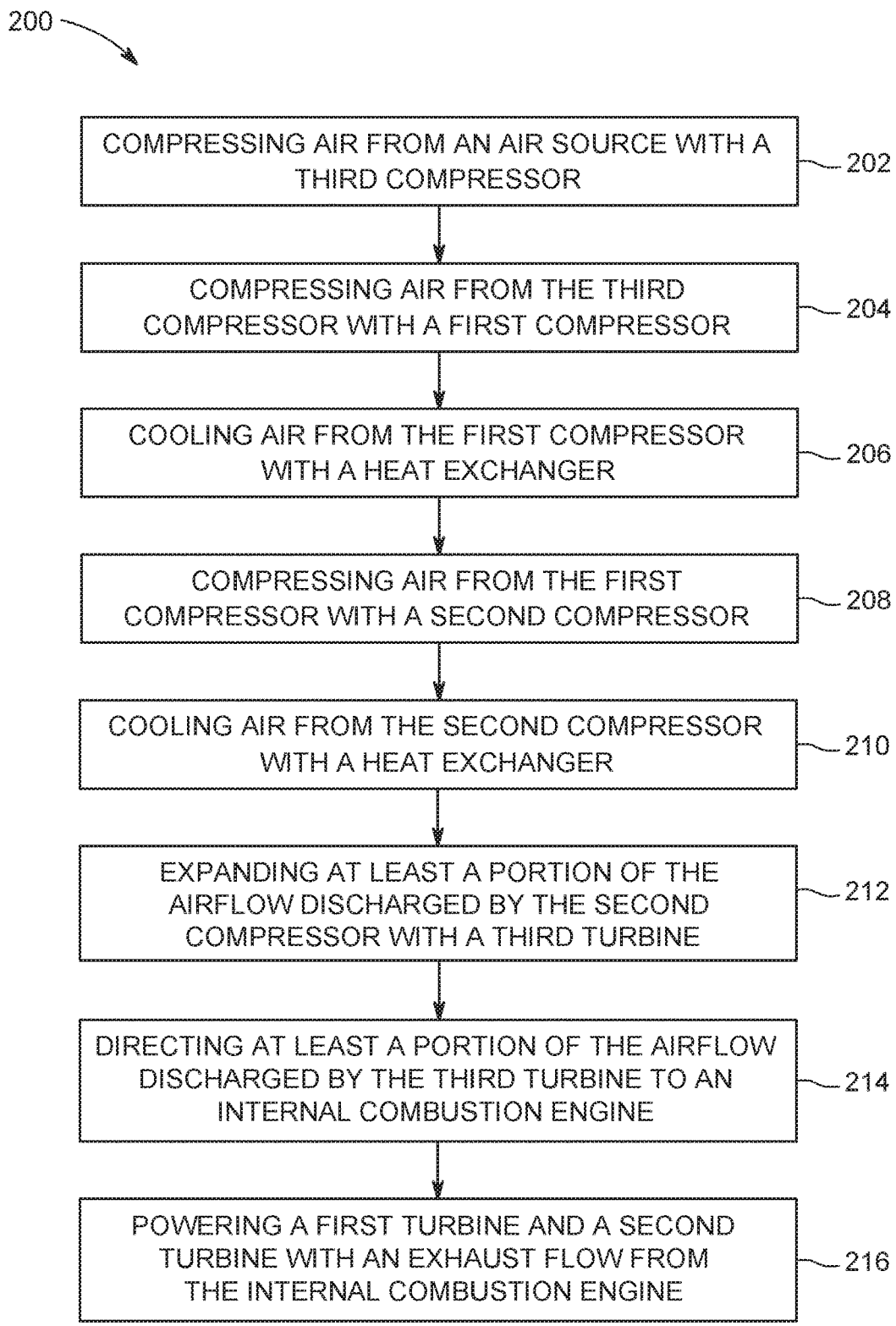

These and other features, aspects, and advantages of the present disclosure will become better understood when the following detailed description is read with reference to the accompanying drawings in which like characters represent like parts throughout the drawings, wherein:

FIG. 1 is a schematic diagram of an intake conditioning system for an internal combustion engine; and FIG. 2 is a flow chart of an exemplary method of cooling intake air using the intake conditioning system shown in FIG. 1.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, unless context suggests otherwise, the terms "air" or "airflow" means the standard mixture of chemicals found in the atmosphere, but also means any mixtures of air and combustible gases that enables an internal combustion engine to function as described herein, including, but not limited to, natural gas and air mixtures.

As used herein, unless context suggests otherwise, the terms "intake turbocharger," "intake compressor," and/or "intake turbine" refer to a turbocharger, compressor, and/or turbine that is in fluid communication with an intake air source and not in fluid communication with an exhaust source.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The inlet conditioning system as described herein overcomes a number of deficiencies associated with known intake systems for internal combustion (IC) engines. Specifically, known IC engines with a fixed intake valve timing to realize a Miller cycle experience a reduction in volumetric efficiency, either because the intake valves close early before the piston reaches bottom dead center during the intake stroke (early Miller) or because the intake valves are left open during a portion of the compression stroke (late Miller). By using an additional turbocharger to cool the engine intake flow, the intake temperature and the temperature in the cylinder can be reduced without a permanent reduction in the volumetric efficiency of the engine. The resulting lower intake temperature reduces nitrogen oxide ($NO_x$) emissions and improves the knocking margin in spark-ignited or dual fuel engines. Moreover, the cooling effect by the additional turbocharger can be switched off or bypassed during cold start of dual-fuel engines or during transients for maximum charging pressure in combination with high volumetric efficiency.

FIG. 1 is a schematic diagram of an intake conditioning system 100 for an internal combustion (IC) engine 102. Intake conditioning system 100 includes internal combustion engine 102 and two turbochargers coupled in series, specifically, a first turbocharger 110, including a first shaft 112 coupling a first compressor 114 to a first turbine 116, and a second turbocharger 120, including a second shaft 122 coupling a second compressor 124 to a second turbine 126. Intake conditioning system 100 further includes a third turbocharger 130, which includes a third shaft 132 coupling a third compressor 134 to a third turbine 136. Compressors 114, 124, and 134 are configured to compress intake air and include any suitable compressors including, but not limited to, a centrifugal compressor, axial compressor, or rotary screw compressor. Turbine 136 is configured to expand and cool the compressed air before it enters IC engine 102. Turbines 116 and 126 are configured to reuse exhaust from IC engine 102 to rotate shafts 110 and 120, respectively, to operate compressors 114 and 124, respectively. Turbines 116, 126, and 136 are any suitable turbine or expander, including, but not limited to, a centrifugal turbine or an axial flow turbine, that enables intake conditioning system 100 to operate as described herein. Furthermore, intake conditioning system includes inter-stage cooler 137 and after-cooler 138, both of which are configured to reduce the temperature of a resulting airflow from each of compressors 114 and 124, respectively. Inter-stage cooler 137 and after-cooler 138 are any suitable heat exchangers that enable intake conditioning system 100 to operate as described herein.

First turbocharger 110 and second turbocharger 120 are configured to provide a high enough pressure ratio such that, for given intake valve timing, the required air pressure of intake air into engine 102 is achieved if third turbocharger 130 is active, i.e., not bypassed. By way of example only, in the exemplary embodiment, the pressure ratio of airflow 156 to ambient air 140 is within a range extending from and including about 6.0 to and including about 12.0 between the resulting airflow after compression by compressor 124 and ambient air pressure. In alternative embodiments, the pressure ratio of airflow 156 to ambient air 140 is any suitable pressure ratio that enables intake conditioning system 100 and engine 102 to function as described herein. In the exemplary embodiment, this configuration leads to a pressure reserve that is available once third turbocharger 130 is switched off by bypassing turbine 136 with valve 160 as well as opening valve 143 to minimize pressure losses. This pressure reserve, in combination with a high volumetric efficiency of the engine, provides faster ramp up and load acceptance capability of engine 102.

In operation, ambient air 140, also referred to herein as air source 140, feeds into intake conditioning system 100 and is directed to compressor 134 of third turbocharger 130. In one embodiment, a series of components such as an air filter, mass flow rate sensor, pressure sensor, and temperature sensor (none shown) interact with the ambient airflow 140 before ambient air 140 reaches intake conditioning system 100. Compressor 134 compresses the air and directs compressed airflow 142 to compressor 114.

Also, in operation, a resulting airflow 144 from compressor 134 and/or from valve 143 flows into compressor 114 of first turbocharger 110. First turbocharger 110 discharges resulting compressed air 149 that encounters inter-stage cooler 137, which acts as a heat exchanger to remove heat and reduce the temperature of compressed air 149. Cooled, compressed air 151 then flows into compressor 124 of second turbocharger 120, which further compresses the air and discharges resulting compressed air 152 toward after-cooler 138. The resulting pressure of the exiting air, i.e., compressed air 152 is at the nominal operation point with the maximum expansion ratio of turbine 136 significantly higher than the required manifold pressure at 162, e.g., about and including 1.2 to about and including 2 times the required manifold pressure. Compressed air 152 flows into after-cooler 138, which, much like inter-stage cooler 137, acts as a heat exchanger to remove heat and reduce the temperature of compressed air 152. Cooled, compressed air 156 is discharged from after-cooler 138. Dependent on valve 160, airflow 156 either bypasses turbine 136 and flows directly to engine 102, or a portion or all of flow 164 expands through turbine 136. If valve 160 opens to allow flow 163 to completely bypass turbine 136, then valve 143 is opened to minimize the pressure loss in intake airflow 140 upstream of compressor 134. In alternative embodiments, turbine 136 includes a variable turbine geometry to flexibly adjust the pressure ratio of turbine 136. The bypassing or reducing the pressure ratio of turbine 136 is beneficial for fast load acceptance of engine 102 in part load, or fast ramp up from idle or part load, and for cold start of dual fuel, e.g., gas and diesel, engines. In yet other embodiments, only one of first turbocharger 110 and second turbocharger 120 is included. In other embodiments, inter-stage cooler 137 is not included. In yet another embodiment, three or more turbochargers combine in series to compress air, similar to the series of first turbocharger 110 and second turbocharger 120. In yet another embodiment, one of compressors 114, 124, 134 are fully or partially mechanically driven as a supercharger by coupling to engine 102, for example by, but not limited to, mechanically coupling to a crankshaft of engine 102 (not shown) or by electrically coupling to a generator of engine 102.

Further, in operation, depending on bypass valve 160, airflow is either diverted to intake manifold 162 through airflow line 163, or is diverted to turbine 136 of turbocharger 130 by way of airflow line 164. All, some, or none of the airflow is diverted to airflow line 164 instead of airflow line 163, dependent on the desired amount of air to be cooled by expansion through turbine 136 of turbocharger 130. The airflow 164 through turbine 136 rotates shaft 132, which drives compressor 134 to initially compress ambient air 140. Turbine 136 expands airflow 164 and discharges it into a cooler airflow line 165. Airflow 165 is then directed to intake manifold 162. In the exemplary embodiment, the temperature of the air at 156 can be reduced by turbine 136 by about 5 degrees Celsius (° C.) to about 20 degrees Celsius (° C.). In alternative embodiments, the temperature of cooled airflow 165 discharged from turbine 136 is any temperature less than airflow 164 upon entry to turbine 136. This reduction of temperature of the inlet airflow decreases NOx emissions without permanently reducing the volumetric efficiency of IC engine 102. The reduction of temperature of airflow 165 reduces the tendency of IC engine 102 to experience knocking when engine 102 is a spark-ignited or a dual-fuel engine.

Moreover, in operation of one embodiment, intake manifold 162 receives airflow 163, cooled airflow 165, and a third airflow line, cold recirculation line 167, from exhaust gas recirculation cooler 170. The pressure conditions in intake manifold 162 and in recirculation line 167, in combination with the valves 191 and 192, regulate the desired fraction of the exhaust gas recirculation. At least some cylinders in engine 102 are separated for exhaust gas recirculation 177, while exhaust 172 from the remaining cylinders is directed toward turbines 116 and 126. The number of cylinders in engine 102 of which exhaust line 167 separates will define the maximum exhaust gas recirculation possible under operation.

Also, in operation of one embodiment, raw exhaust 177 expelled from some cylinders of IC engine 102 is optionally diverted to an exhaust gas recirculation system 173 including exhaust gas recirculation cooler 170, which acts as a heat exchanger to cool the flow before it is reintroduced into IC engine 102 via cold recirculation line 167 and intake manifold 162. Exhaust gas recirculation valve 192 reduces the exhaust gas recirculation rate up to the total switch off of exhaust gases, in combination with valve 191, which ensures that no backflow from the intake occurs. Alternatively, some or all of the raw exhaust from engine 102 flows along exhaust line 175 to second turbocharger 120. Exhaust 175 powers second turbocharger 120 by rotating turbine 126, which rotates shaft 122 and drives compressor 124. Second turbine 126 discharges exhaust flow 182 toward first turbine 116 of first turbocharger 110.

In one embodiment, a control valve 184 controls flow 185 that bypasses second turbine 126 of second turbocharger 120 to flow toward first turbine 116 of first turbocharger 110. Resulting exhaust flow 182 either includes exhaust gas from second turbine 126, exhaust gas that is bypassing second turbine 126 via the opening of valve 184, or mixtures of both. Resulting exhaust flow 182 powers first turbocharger 110 by rotating turbine 116, which rotates shaft 112 and drives compressor 114. In an alternative embodiment (not shown), a control valve similar to control valve 184 controls a flow similar to flow 185 that is redirected bypass first turbine 116 of first turbocharger 110. Exit exhaust 188 is directed to an exhaust system (not shown), which may include a temperature gauge, catalytic converter, muffler, or other downstream exhaust devices.

In one embodiment, first turbocharger 110 and second turbocharger 120 are exhaust-driven turbochargers, also described herein as exhaust turbochargers, used in series, such as the configuration shown in FIG. 1. That is, first turbocharger 110 and second turbocharger 120 are powered by exhaust from IC engine 102, while first turbocharger 110 and second turbocharger 120 compress the intake air before the flow reaches IC engine 102. In alternative embodiments, a plurality of exhaust-driven turbochargers is used in series, including one, two (shown in FIG. 1), three or more turbochargers, similar to the configuration of first turbocharger 110 and second turbocharger 120.

Third turbocharger 130 is a cooling turbocharger, also described herein as a non-exhaust driven turbocharger, an intake turbocharger, or an expansion turbocharger, meaning that third turbocharger 130 does not rely on exhaust from IC engine 102 to compress air. Rather, third turbocharger 130 mildly compresses air initially, and then expands the air after compression from exhaust-driven turbochargers 110, 120 and cooling from inter-stage cooler 137 and after-cooler 138. This procedure cools the airflow while maintaining a typical pressure before entering IC engine 102. In alternative embodiments, a cooling turbocharger similar to third turbocharger 130 is configured to interact with the airflow at a different stage. For example, in one embodiment, instead of initially compressing ambient air 141, third turbocharger 130 is positioned between first turbocharger 110 and second turbocharger 120. In alternative embodiments, a plurality of cooling turbochargers similar to third turbocharger 130 is used. Although, as shown in FIG. 1, airflow is generally directed to third compressor 134, then to first compressor 114, then to second compressor 124, in alternative embodiments, other configurations are used. For example, in one alternative embodiment, third compressor 134 is positioned in series between first compressor 114 and second compressor 124, and intake airflow is channeled to first compressor 114, then to third compressor 134, and then to second compressor 124.

FIG. 2 is a flow chart of an exemplary method 200 of cooling intake air using intake conditioning system 100 (shown in FIG. 1). Referring to FIGS. 1 and 2, in the exemplary embodiment, ambient air 140 is compressed 202 with third compressor 134. Alternatively, if turbine 136 is fully bypassed, the entire intake flow 140 bypasses third compressor 134 via bypass valve 143. In the exemplary embodiment, compressed airflow 142 discharged from third compressor 134 is compressed 204 by first compressor 114. Airflow 149 discharged by first compressor 114 is cooled 206 by heat exchanger 137. Airflow 151 discharged by first compressor 114 and cooled and discharged by heat exchanger 137 is compressed 208 by second compressor 124. Airflow 152 discharged by second compressor 124 is cooled 210 by heat exchanger 138. At least a portion of airflow 152 discharged by second compressor 124 and cooled and discharged 156 by heat exchanger 138 is expanded 212 by third turbine 136. In an alternative embodiment, if turbine 136 is bypassed, ambient air 140 also bypasses compressor 134. Airflow 165 discharged by third turbine 136 is directed 214 to internal combustion engine 102. At least a portion of exhaust flow 172 from internal combustion engine 102 powers 216 first turbine 116 and second turbine 126, and first turbine 116 is fluidly coupled downstream of second turbine 126.

The above-described inlet conditioning system overcomes a number of deficiencies associated with known intake systems for internal combustion (IC) engines. Specifically, known IC engines with a fixed intake valve timing to realize a Miller cycle experience a reduction in volumetric efficiency, either because the intake valves close early before the piston reaches bottom dead center during the intake stroke (early Miller) or because the intake valves are left open during a portion of the compression stroke (late Miller). By using an additional turbocharger to cool the engine intake flow, the intake temperature and the temperature in the cylinder can be reduced without a permanent reduction in the volumetric efficiency of the engine. The resulting lower intake temperature reduces NOx emissions and improves the knocking margin in spark-ignited or dual-fuel engines. Moreover, the cooling effect by the additional turbocharger can be switched off or bypassed during cold start of dual-fuel engines or during transients for maximum charging pressure in combination with high volumetric efficiency.

An exemplary technical effect of the methods, systems, and apparatus described herein includes at least one of: (a) reduces temperature level in the cylinder without permanently reducing the volumetric efficiency of the IC engine; (b) the reduction in temperature decreases $NO_x$ emissions; (c) reduce the tendency of the engine to experience knocking for gas or gasoline-powered IC engines or for dual fuel IC engines; (d) improves cold start capability in dual-fuel IC engines which require lower compression ratios for dual fuel combustion with a high energy fraction provided from the burning gas relative to total fuel energy; and (e) improves transient performance if the intake turbine is bypassed to increase the manifold pressure for fast ramp up of the engines and load acceptance capability.

Exemplary embodiments of an inlet conditioning system are described above in detail. The inlet conditioning system and methods of manufacturing or operating such a system and device are not limited to the specific embodiments described herein, but rather, components of systems and/or steps of the methods may be utilized independently and separately from other components and/or steps described herein. For example, the systems, apparatus, and methods may also be used in combination with each other and other types of IC engines, and are not limited to practice with only the devices, systems and methods as described herein. Rather, the exemplary embodiments can be implemented and utilized in connection with other IC engines.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   an air source;
   an internal combustion engine;
   a first turbocharger including a first turbine and a first compressor;
   a second turbocharger including a second turbine and a second compressor; and
   a third turbocharger including a third turbine and a third compressor, the third turbine configured to receive compressed air from the second compressor, wherein the third compressor is fluidly coupled to the air source, the third compressor is fluidly coupled upstream of at least one of the first compressor or the second compressor, the first compressor is fluidly coupled upstream of the second compressor, the second compressor configured to receive compressed air from the first compressor, the second compressor is fluidly coupled upstream of the third turbine, and the third turbine is fluidly coupled upstream of the internal combustion engine;
   wherein when the compressed air discharged from the second compressor is at a nominal operation point with a maximum expansion ratio of the third turbine, the compressed air discharged from the second compressor is at a pressure higher than a required pressure in an intake manifold.

2. The system in accordance with claim 1, wherein the first turbine and the second turbine are fluidly coupled with the internal combustion engine, the internal combustion engine configured to power the first turbine and the second turbine through exhaust therefrom.

3. The system in accordance with claim 1, further comprising at least one inter-stage cooler in fluid communication with the first compressor.

4. The system in accordance with claim 1, further comprising an after-cooler in fluid communication with the second compressor.

5. The system in accordance with claim 1, further comprising the intake manifold fluidly coupled downstream of the third turbine, the intake manifold fluidly coupled upstream of the internal combustion engine.

6. The system in accordance with claim 1, wherein at least a portion of an exhaust flow from the internal combustion engine bypasses one of the first turbine and the second turbine.

7. The system in accordance with claim 1, wherein the first turbocharger and the second turbocharger are fluidly coupled in series.

8. The system in accordance with claim 1, wherein the third compressor is fluidly coupled upstream of both the first compressor and the second compressor.

9. The system in accordance with claim 5, further comprising an exhaust gas recirculation system fluidly coupled downstream of the internal combustion engine, wherein the exhaust gas recirculation system is configured to redirect at least a portion of the exhaust from the internal combustion engine to the intake manifold.

10. The system in accordance with claim 9, the exhaust gas recirculation system further comprising an exhaust gas recirculation cooler fluidly coupled to the intake manifold.

11. A turbocharger system for an internal combustion engine, wherein the turbocharger system comprises:
    an air source configured to deliver air into the turbocharger system;
    a first turbocharger comprising a first turbine and a first compressor;
    a second turbocharger comprising a second turbine and a second compressor; and
    a third turbocharger comprising a third turbine and a third compressor, the third turbine configured to receive compressed air from the second compressor, wherein the third compressor is configured to be fluidly coupled to the air source, the third compressor is fluidly coupled upstream of at least one the first compressor or the second compressor, the first compressor is fluidly coupled upstream of the second compressor, the second compressor configured to receive compressed air from the first compressor, the second compressor is fluidly coupled upstream of the third turbine, and wherein the third turbine is configured to be fluidly coupled upstream of the internal combustion engine via an intake manifold;
    wherein when the compressed air discharged from the second compressor is at a nominal operation point with a maximum expansion ratio of the third turbine, the compressed air discharged from the second compressor is at a pressure higher than a required pressure in the intake manifold.

12. The turbocharger system in accordance with claim 11, wherein the first turbine and the second turbine are configured to be fluidly coupled with the internal combustion engine, the internal combustion engine configured to power the first turbine and the second turbine through exhaust therefrom.

13. The turbocharger system in accordance with claim 11, further comprising an inter-stage cooler in fluid communication with the first compressor.

14. The intake delivery turbocharger system in accordance with claim 11, further comprising an after-cooler in fluid communication with the second compressor.

15. The turbocharger system in accordance with claim 11, further comprising the intake manifold fluidly coupled downstream of the third turbine.

16. The turbocharger system in accordance with claim 11, wherein at least a portion of an exhaust flow from the internal combustion engine bypasses one of the first turbine and the second turbine.

17. The turbocharger system in accordance with claim 11, wherein the third compressor is fluidly coupled upstream of both the first compressor and the second compressor.

18. The turbocharger system in accordance with claim 15, further comprising an exhaust gas recirculation system configured to be fluidly coupled downstream of the internal combustion engine, wherein the exhaust gas recirculation system is configured to redirect at least a portion of the exhaust from the internal combustion engine to the intake manifold.

19. The turbocharger system in accordance with claim 18, the exhaust gas recirculation system further comprising an exhaust gas recirculation cooler fluidly coupled to the intake manifold.

20. A method of cooling intake air for an internal combustion engine using an intake delivery system that includes an air source, an internal combustion engine, a first turbocharger including a first turbine and a first compressor, a second turbocharger including a second turbine and a second compressor, and a third turbocharger including a third turbine and a third compressor, the method comprising:

compressing air from the air source with the third compressor;

compressing air from the third compressor with the first compressor;

compressing air from the first compressor with the second compressor;

expanding an airflow discharged by the second compressor with the third turbine; and directing an airflow discharged by the third turbine to the internal combustion engine, wherein when the compressed air discharged from the second compressor is at a nominal operation point with a maximum expansion ratio of the third turbine, the compressed air discharged from the second compressor is at a pressure higher than a required pressure in an intake manifold.

21. The method in accordance with claim 20, further comprising powering the first turbine and the second turbine with an exhaust flow from the internal combustion engine, wherein the first turbine is fluidly coupled downstream of the second turbine.

* * * * *